United States Patent [19]
Beck

[11] Patent Number: 5,653,107
[45] Date of Patent: Aug. 5, 1997

[54] HYDROSTATIC PROPULSION DRIVE

[75] Inventor: Jochen Beck, Ulm, Germany

[73] Assignee: Brueninghaus Hydromatik GMBH, Elchingen, Germany

[21] Appl. No.: 564,317

[22] PCT Filed: Jun. 9, 1994

[86] PCT No.: PCT/EP94/01887

§ 371 Date: Mar. 28, 1996

§ 102(e) Date: Mar. 28, 1996

[87] PCT Pub. No.: WO94/29619

PCT Pub. Date: Dec. 22, 1994

[30] Foreign Application Priority Data

Jun. 9, 1993 [DE] Germany .............. 43 19 280.7

[51] Int. Cl.$^6$ .................................................. F16D 31/02
[52] U.S. Cl. ................................................ 60/452; 60/488
[58] Field of Search ............................ 60/443, 444, 445, 60/452, 487, 488

[56] References Cited

U.S. PATENT DOCUMENTS

| | | |
|---|---|---|
| 4,184,466 | 1/1980 | Nagele . |
| 4,395,878 | 8/1983 | Morita et al. ............... 60/444 X |
| 4,543,787 | 10/1985 | Eckhardt . |
| 4,561,250 | 12/1985 | Aoyagi et al. ............... 60/444 X |
| 4,571,940 | 2/1986 | Wuchenauer ............... 60/444 |
| 4,756,156 | 7/1988 | Appel ............................. 60/444 X |
| 4,789,036 | 12/1988 | Haas ............................. 60/444 X |

OTHER PUBLICATIONS

Dipl.–Ing Klaus Högmannn "Hydraulik im Forst", Special Publication Jan. 1984 of the firm Mannesmann Rexroth, pp. 1–6.

Primary Examiner—Hoang Nguyen
Attorney, Agent, or Firm—Scully, Scott, Murphy & Presser

[57] ABSTRACT

The invention relates to a hydrostatic propulsion drive having a drive motor, of variable speed, for a hydraulic machine of a hydraulic transmission, a setting device for the displacement volume of the hydraulic machine, a device for generating a setting pressure proportional to the speed of the drive motor in a setting pressure line, a pilot valve in the setting pressure line which is coupled with the setting device and—dependent upon its though-flow position within a through-flow adjustment range of effective follow-up into the closed position—controls the volume of a pressure medium supplied to the setting device, and in a through-flow end position beyond the effective follow-up acts upon the setting device with the speed-proportional setting pressure. In order to provide higher torques at lower vehicle rates of travel, a pressure medium line (44) for the pressure medium to be supplied to the setting device (4) in the case of effective pilot valve follow-up is connectable with a pressure independent of the speed of the drive motor via a switching device (6.1; 6.2; 6.3) to the setting pressure line (37, 43) upstream of the pilot valve (7), whereby the switching device (6.1; 6.2; 6.3) has a normal and a switched position, in the normal position connects the pressure medium line (44) with the setting pressure line (37, 43) and a blocks the action of the speed-proportional setting pressure upon the setting device (4), and in the switched position blocks the pressure medium line (44) and acts upon the setting device (4) with the speed-proportional setting pressure.

17 Claims, 3 Drawing Sheets

FIG. I

HYDROSTATIC PROPULSION DRIVE

BACKGROUND OF THE INVENTION

The invention relates to a hydrostatic propulsion drive.

In the article "Hydraulik im Forst" by Dipl.-Ing. Klaus H ögemann, which appeared in special publication number 1/84 of the firm Mannesmann Rexroth, there is described a hydrostatic propulsion drive which drives a mobile forestry vehicle and has so-called limit load control and a so-called pilot control.

With the described limit load control, the rate of travel varies with the speed (speed of rotation) of the drive motor, determined by means of the gas pedal, and with the displacement volume of the hydraulic pump which is automatically adjusted in dependence upon a setting pressure proportional to this speed of the drive motor. The hydrostatic propulsion drive is in this case located in the so-called automotive or automatic traction means, which is mainly employed for goods and on-road transportation.

In the case of pilot control the rate of travel is determined, at constant speed of the drive motor, solely by means of the displacement volume of the hydraulic pump which is adjusted in dependence upon the volume of the pressure medium, subjected to the speed-dependent setting pressure, flowing into the setting device. This pilot control permits sensitive control of the rate of travel by means of a hand controller, which sensitive control is particularly important in the operational employment of the vehicle.

The volume control of the pressure medium during the pilot control is achieved with the aid of the mechanical follow-up device which includes a follow-up lever which is attached to the setting piston of the setting device constituted as a setting cylinder and to the control sleeve of the pilot valve and with the pilot valve opened in correspondence to the position of the hand controller transmits the setting movement of the setting piston to the control sleeve for so long that the pilot valve again attains its closed position.

Through further opening of the pilot valve by means of the hand controller, beyond the maximum travel of the follow-up lever, the follow-up is made ineffective and the pilot valve brought into the through-flow end position in which the pressure medium, subjected to the speed-proportional setting pressure, flows for so long into the setting cylinder until equilibrium of forces is effective at its spring loaded setting piston. The hydrostatic propulsion drive is in this way switched from pilot control to limit load control.

Because of the dependence of the displacement volume of the hydraulic pump upon the speed of the drive motor, corresponding to the relevant characteristic line, when travelling with the pilot control, i.e. when travelling with constant drive motor speed, the setting pressure corresponding to this constant speed limits the setting movement of the setting piston and thus the maximum displacement volume of the hydraulic pump, which determines the rate of travel and the torque. Thus, the travel region during the pilot control corresponds to the region below the characteristic line. This is disadvantageous to the extent that high propulsing torques are only available with correspondingly high speed of the driving motor and thus high rate of travel.

SUMMARY OF THE INVENTION

It is an object of the present invention to provide a hydrostatic propulsion drive having high propulsion torques available at lower rates of travel.

This object is achieved as follows. The provision of the switching device along with the provision of the pressure of the pressure medium in the pressure medium line which is independent of the speed of the drive motor, allows this pressure to be provided as speed-independent setting pressure of the setting device, and in this way to suspend the dependence of the displacement volume of the hydraulic machine upon the speed of the drive motor and to achieve a displacement volume setting which corresponds to the level of the speed-independent setting pressure. This is preferably at least equal to the maximum value of the speed-proportional setting pressure, so that the hydraulic machine correspondingly set to maximum displacement volume makes available a correspondingly large propulsing torque. With the switching device in its normal disposition and with effective follow-up of the pilot valve, the propulsion range of the propulsion drive in accordance with the invention comprehends both the region beneath the characteristic line of the speed-proportional setting pressure and also the region above this characteristic line, up to the characteristic line of the speed-independent setting pressure.

The switching device can be switched manually or, to relieve the driver, automatically preferably in dependence upon the speed of the drive motor, from the normal position into the switched position and back again. The switching of the switching device and of the pilot valve from the normal position into the switched position and back again, or from the through-flow adjustment region with effective follow-up into the through-flow end position beyond the region of effective follow-up, and back again, is effective expediently approximately simultaneously. In this way it is ensured that only in the range of the pilot control is propulsion independent of drive motor speed otherwise however being dependent upon drive motor speed. With manual switching of the switching device this can be achieved by means of a controller with which the pilot valve is simultaneously switched.

During the pilot control the possibility exists of adjusting the displacement volume of the hydraulic machine independently of the speed of the drive, motor and thus, for example, to travel with idling drive motor speed, when sufficient power of the drive motor is available, with correspondingly lesser generation of noise. If sufficient power of the drive motor is not available, the pilot valve is expediently actuated by means of the gas pedal for controlling the speed of the drive motor.

In accordance with a first embodiment of the invention, the switching device can be formed as a 3/2 directional control valve having a working connection at a first section of the setting pressure line leading to the device for generating the speed-proportional setting pressure proportional, a working connection at a second section of the setting pressure line extending further to the pilot valve, and a working connection to the pressure medium line. This 3/2 directional control valve is, in the case of automatic switching, expediently controllable in the direction of the switched position with the speed-proportional setting pressure.

In accordance with another embodiment, the switching device is formed as a non-return valve arranged in the pressure medium line, which valve opens in the direction of the setting pressure line when the speed-independent setting pressure is larger than the speed-proportional setting pressure. Here there may be arranged in the pressure medium line, upstream of the non-return valve, a pressure reduction valve which is preferably adjustable for the purpose of generating differing output pressures. In this way, the speed-proportional setting pressure can be overcome with different values of the speed-independent setting pressure and thus the switching point of the switching device can be adjusted.

Further features and advantages of the invention will become apparent from consideration of the following detailed description which specifies a preferred embodiment of the invention.

BRIEF DESCRIPTION OF THE DRAWINGS

Below, the invention is described in more detail with reference to three preferred exemplary embodiments and with reference to the drawings, which show.

DETAILED DESCRIPTION OF THE PREFERRED EMBODIMENT

Figure 1:
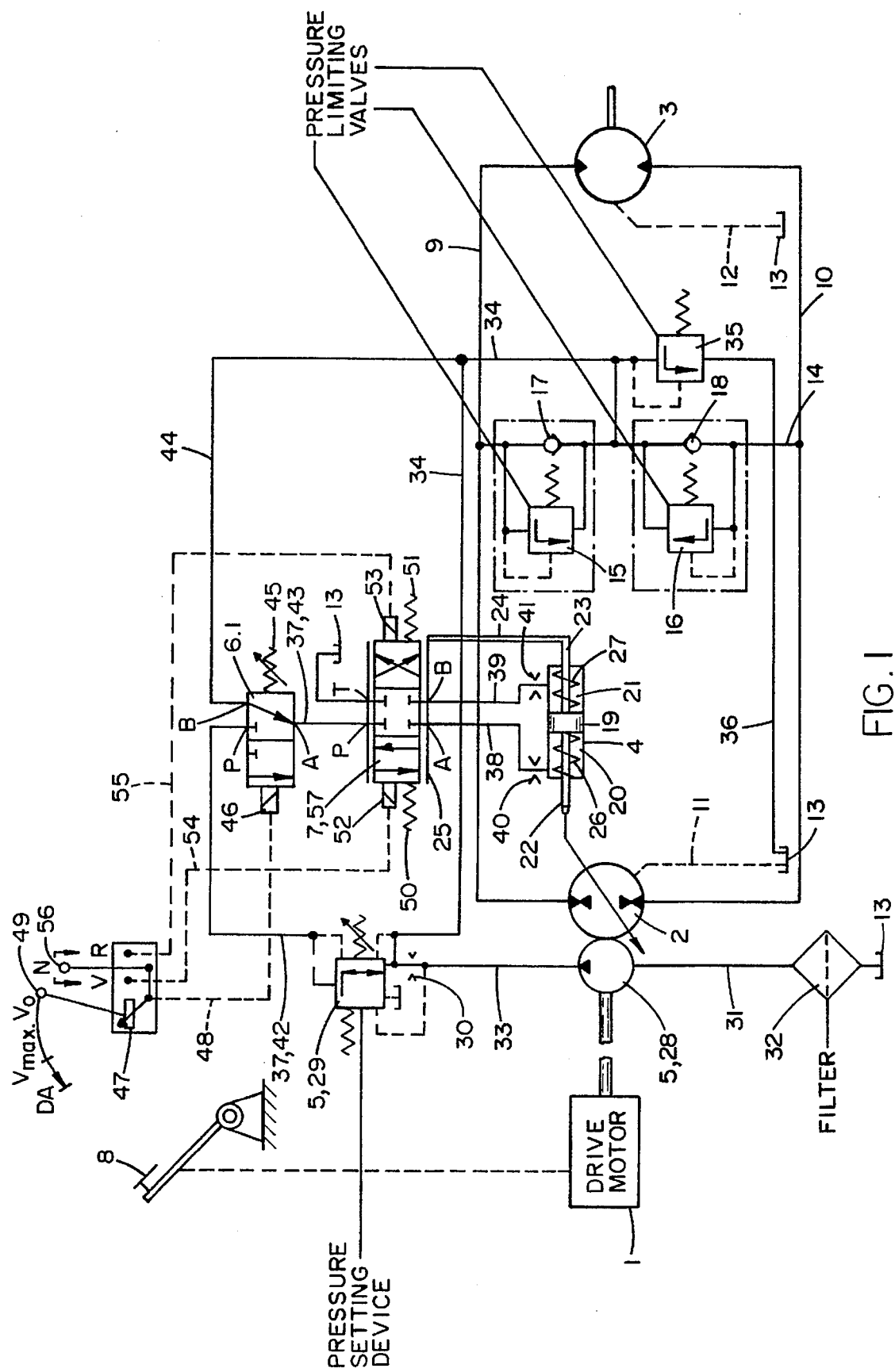
FIG. 1 a circuit diagram of a hydrostatic propulsion drive in accordance with the first exemplary embodiment of the invention, FIG. 2 a circuit diagram of a hydrostatic propulsion drive in accordance with the second exemplary embodiment of the invention, and FIG. 3 a circuit diagram of a hydrostatic propulsion drive in accordance with the third exemplary embodiment of the invention.

The hydrostatic propulsion drive illustrated in FIG. 1, for example for a fork lift truck or a compact loader, includes a drive motor 1, a hydrostatic transmission having a hydraulic pump 2 of variable delivery or displacement volume and a hydraulic motor 3 of constant displacement or swept volume for the drive of at least one vehicle propulsion wheel (not shown), a setting device 4 for adjusting the displacement volume of the hydraulic pump 2, a device 5 for generating a setting pressure proportional to the speed of the drive motor 1, a switching device 6.1 and a pilot valve 7 associated with the setting device 4.

The drive motor 1 is for example a Diesel motor with variable speed and connected with a gas pedal 8 for giving the desired speed in each case.

The hydraulic pump 2 is a reversible axial piston pump which is mechanically coupled with the drive motor 1 and is in fluid connection, in a closed circuit, via two working lines 9 and 10, with the hydraulic motor 3, likewise of axial piston design. The hydraulic pump 2 and the hydraulic motor 3 are connected via respective leakage oil lines 11, 12 to the tank 13. The two working lines 9, 10 are connected with one another via a line 14, to which two pressure limiting valves 15, 16, each in shunt connection around a respective non-return valve 17, 18, are connected. Each non-return valve 17, 18 blocks in the direction of the other non-return valve 18, 17 so that the pressure limiting valves 15, 16 limit the working pressure in the working line 9 or 10 carrying in each case the higher pressure.

The setting device 4 comprises a double acting hydraulic setting cylinder in which a synchronizing piston 19 defines two pressure chambers 20, 21 and is coupled via one half 22 of a double-sided piston rod 22, 23 with the e.g. swash plate of the hydraulic pump 1 and with the other half 23 via a follow-up lever 24 to a control sleeve 25 of the pilot valve 7. The synchronizing piston 19 is spring centered by means of respective centering springs 26, 27 arranged in the two pressure chambers 20, 21 each on one of the piston rod halves 22, 23.

The device 5 for generating the setting pressure proportional to the drive motor speed comprises an auxiliary pump 28 of constant displacement volume, mechanically coupled with the drive motor 1, and a so-called DA (speed dependent) control valve 29 with a preceding diaphragm 30. A suction line 31 with a filter 32 arranged therein connects the tank 13 with the inlet of the auxiliary pump 28 the outlet of which is in connection with the inlet of the DA control valve 29 via a connection line 33. A feed line 34 is connected, upstream of the diaphragm 30, to the connection line 31 and leads to line 14 into which it opens in the region between the two non-return valves 17, 18. A pressure limiting valve 35 for limiting the feed pressure is connected to the feed line 34 and connected via a relief line 36 to the tank 13. A setting pressure line 37 connected to the output of the DA control valve 29 leads to the pilot valve 7 from which two setting pressure branch lines 38, 39 lead to the pressure chambers 20, 21 of the setting cylinder 4. Respective diaphragms 40, 41 are arranged in the setting pressure branch lines 38, 39.

The switching device 6.1 is a 3/2 directional control valve which is arranged in the setting pressure line 37 and divides this into a first setting pressure line section 42 leading to the DA control valve 29 and a second setting pressure line section leading to the pilot valve 7. The 3/2 directional control valve 6.1 has a working connection P to the first setting pressure line section 42, a second working connection A to the second setting pressure line section 43 and a working connection B to a pressure medium line 44 which opens into the feed line 34. The 3/2 directional control valve 6.1 is acted upon by means of a settable compression spring 45 in the direction of the normal position shown in FIG. 1 in which the working connection P is blocked and the remaining working connections A and B are connected with one another. For the purpose of actuating the 3/2 directional control valve 6.1 there is provided on its side away from the compression spring 45 a proportional magnet 46 which can be controlled with a control signal generated from a potentiometer 47 via a control signal line 48 connected to the potentiometer 47. The control signal generated by the potentiometer 46 is proportional to the adjustment travel of the hand controller 49 in each case. Upon setting of this hand controller 49 to "DA" it generates with the proportional magnet 46 controlled by the corresponding control signal a force which exceeds the force of the compression spring 45 and switches the 3/2 directional control valve 6.1 from the normal position into the switched position, in which—with blocked working connection B—the working connections P and A are connected with one another. Through adjustment of the compression spring 45 the switch-over point of the 3/2 directional control valve 6.1 can be displaced.

The pilot valve 7 is a throttled 4/3 directional control valve spring centered by means of centering springs 50, 51, having a working connection T to the tank 13, a working connection P to the second setting pressure line section 42 and two working connections A, B to the setting pressure branch lines 37, 38. In its (spring centered) middle position shown in FIG. 1, all working connections A, B, P and T of the pilot valve 7 are blocked so the synchronizing piston 19 of the setting cylinder 4 takes up its (spring centered) middle position shown in FIG. 1 and thus the hydraulic pump 2 takes up its zero disposition with zero displacement volume. For the purpose of actuation of the pilot valve 7 there are provided at its mutually opposite ends respective proportional magnets 52, 53 which are controllable, via respective control signal lines 54, 55 and a travel direction switch 56, with the control signal generated by the potentiometer 47. In accordance with the position of the travel direction switch 56 for forwards for rearwards travel (position V or position R), the left or left or right proportional magnet 52, 53 displaces the control slide 57 of the pilot valve 7 by a setting distance proportional to the control signal into a right or left through-flow position in which the working connections P and B, and C and A, or P and A, and T and B, of the pilot valve 7 are connected with one another. Upon setting of the hand controller 49 to $V_{max}$ the setting distance of the control slide 57 is equal to the maximum setting distance of the synchronizing piston 19. The through-flow adjustment region of the pilot valve corresponding to this maximum setting distance is a region of pilot control or of effective follow-up in which the synchronizing piston 19 carries the control sleeve 25 with it, via the follow-up lever 24, in the same direction and by the same amount upon its movement in the direction of the end position, i.e. it displaces the sleeve over and beyond the control slide 57 so far that the pilot valve 7 is returned to its middle position. Upon setting of the hand controller 49 to the position DA, the control slide 57 of the pilot valve 7 is displaced beyond the end position of the synchronizing piston 19 and thereby the pilot valve 7 is switched over into a through-flow end position beyond the region of effective follow-up, i.e. is switched over to speed-dependent (DA) control. This through-flow end position is maintained for so long as the hand controller 49 is located in the position DA.

The functioning of the hydrostatic travel drive according to FIG. 1 is as follows:

With the vehicle at a standstill, the hand controller 49 is in the initial position $V_0$ shown in FIG. 1 so that the potentiometer 47 generates no control signal and correspondingly the switching 3/2 directional control valve 6.1, the pilot valve 7 and thus the setting cylinder 4 take up the normal position or the spring-centered middle position. The hydraulic pump 2, driven by the idling drive motor 1, is consequently set to zero displacement volume and consequently does not drive the hydraulic motor 3.

In order to initiate forward travel, the travel direction switch 56 is switched over to the position V and the hand controller 49 displaced in the direction $V_{max}$. The left proportional magnet 52 in FIG. 1 displaces the control slide 57 of the pilot valve 7 to the right (in FIG. 1) into a through-flow position corresponding to the position of the hand controller 49, so that the setting pressure line section 43 is connected via the left setting pressure branch line 38 with the left pressure chamber 20 of the setting cylinder 4 and the right pressure chamber 21 thereof is relieved via the right setting pressure branch line 39 to the tank 13. The pressure medium transported by the auxiliary pump 28 can now flow to the left pressure chamber 20 of the setting cylinder 4 via the connection line 33, the feed line 34, the pressure medium line 44 and the 3/2 directional control valve 6.1 which is still in the normal position. The pressure which thereby builds up in the pressure chamber 20, which is independent of the speed of the drive motor 1, displaces the synchronizing piston 19 to the right as a control pressure, whereby the synchronizing piston simultaneously draws back the control sleeve 25, as described above, for so long that the pilot valve 7 assumes its middle position. Corresponding to the setting path of the synchronizing piston 19, which remains in the position achieved, the hydraulic pump 2 is thereby set to a larger displacement volume and the hydraulic motor 3 caused to rotate, assuming that the idling driving motor 1 has a sufficiently large torque. Otherwise, the speed of the drive motor 1 is so far increased by means of the gas pedal 8 that the torque necessary to start motion is available at the hydraulic motor 3. Upon the return movement of the hand controller 49 in the direction of the position $V_0$, the hydraulic pump 2 is tilted back in the direction of zero displacement volume.

Upon setting of the hand controller 49 to $V_{max}$, the hydraulic pump 2 is tilted out to the displacement volume corresponding to the control signal, for example maximum displacement volume, given that the speed-independent setting pressure is set by means of the pressure limiting valve 35 to such a value that its hydraulic force effective on the synchronized piston 19 is sufficient to displace this synchronizing piston against the force of the centering spring 27 up into its right end position. If the speed-independent setting pressure is, however, set to a lesser value, the hydraulic pump 2 tilts out—even with setting of the hand controller 40 to $V_{max}$—to a displacement volume less than maximum. The control signal can be varied by means of corresponding setting of the potentiometer 47 independently of the respective position of the hand controller 49.

Through corresponding increase of the speed of the drive motor 1 by means of the gas pedal 8 the same rate of travel as with maximum displacement volume setting can be achieved even with this lesser displacement volume setting.

As soon as the hand controller 49 is set to the position DA, the 3/2 directional control valve 6.1 and the pilot valve 7 are switched over into the switched position or into the through-flow end position. Via the setting pressure line sections 42, 43, which are now connected with one another, and the left setting pressure branch line 38 the synchronizing piston 39 is acted upon—by the speed-proportional setting pressure generated by the DA control valve 29 in the manner described below—for so long and is displaced until equilibrium exists between the hydraulic force of this setting pressure and the force of the centering springs 26, 27. Consequently, the hydraulic pump 2 is tilted out to a displacement volume which is proportional to the respective speed of the drive motor 1 (corresponding to a predetermined speed/displacement volume characteristic line).

The auxiliary pump 28, driven with the speed of the drive motor 1, delivers a pressure medium flow proportional to the speed which generates a pressure difference at the diaphragm 30 which opens the DA control valve 29, whereby there is built up at its outlet a pressure available in the setting pressure line section 42 as setting pressure, which works against the pressure difference and displaces the DA control valve 29 in the direction of closed disposition until an equilibrium of forces exists at the valve body. In this way it is achieved that the setting pressure working against the pressure difference is proportional to the pressure medium flow—proportional to the speed delivered by the hydraulic pump 28 and thus proportional to the speed of the drive motor 1.

Figure 2:
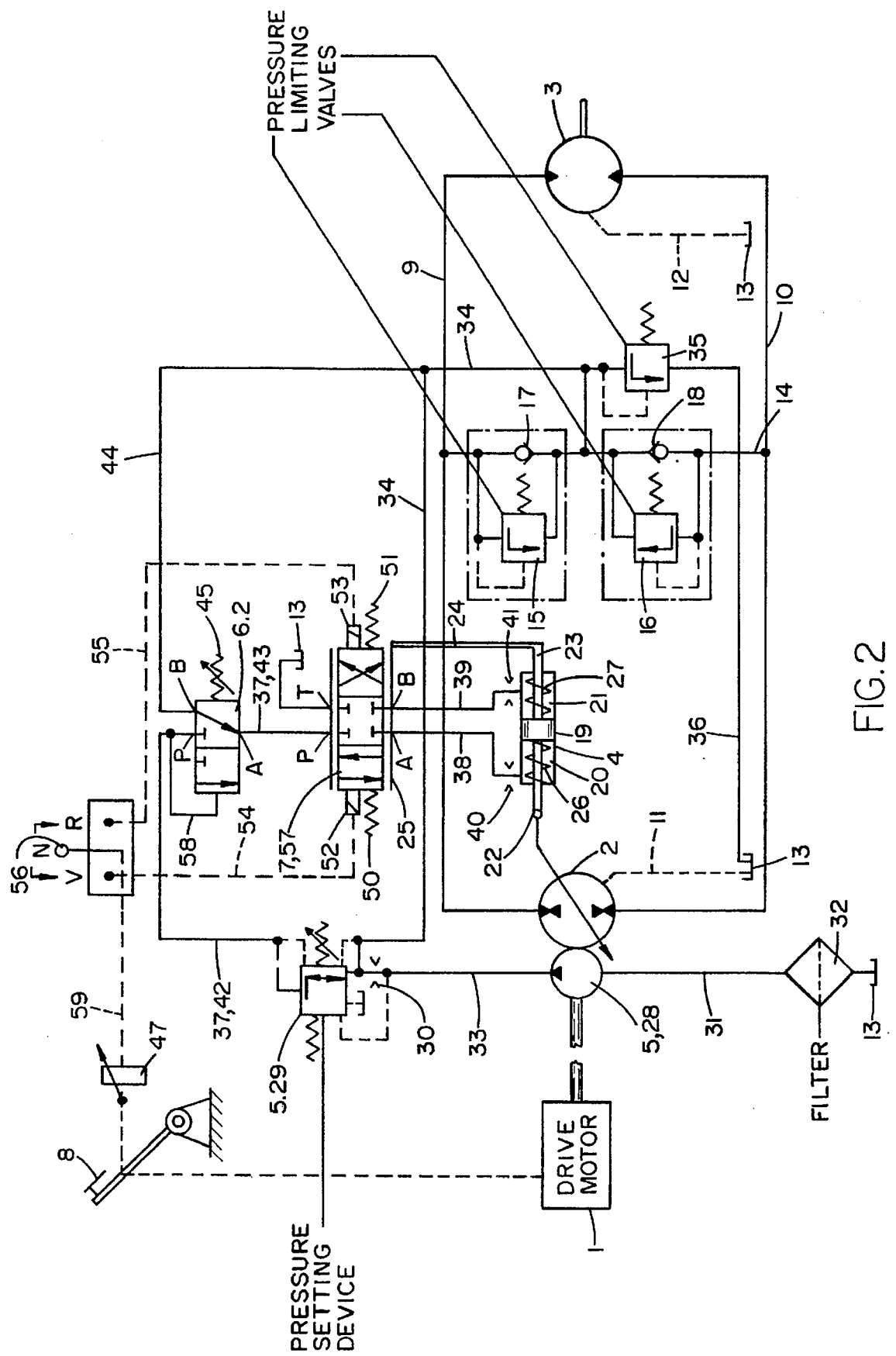

The hydrostatic propulsion drive illustrated in FIG. 2 in accordance with the second exemplary embodiment of the invention differs from the first exemplary embodiment, with otherwise similar construction, in that the 3/2 directional control valve indicated by the reference sign 6.2 is not electrically controllable via the control signal line 48 but is hydraulically controllable via a control pressure line 58 connected to the setting pressure line section 42, with the speed-proportional setting pressure, and further in that the hand controller 49 is omitted and instead the pilot valve 7 is actuated by means of the gas pedal 8. For this purpose, the potentiometer 47 detects the position of the gas pedal 8 and is connected with the travel direction switch 56 via a control signal line 59.

Upon travel in the range of the pilot control, with the propulsion drive according to FIG. 2—in contrast to the displacement volume setting of the hydraulic pump 2 independently of the speed of the drive motor 1 with the propulsion drive according to FIG. 1—upon actuation of the gas pedal 8 the speed of the drive motor 1 and also the displacement volume of the hydraulic pump 2 are adjusted in the same sense. In the for example mechanical connection between the gas pedal 8 and the drive motor 1 there may also be provided a preferably adjustable dead zone which is overcome only upon switching over of the pilot valve 7 into the through-flow end position, so that the same speed-independent control of the displacement volume of the hydraulic pump as in the exemplary embodiment according to FIG. 1 is attained. As a consequence of the control with the speed-proportional setting pressure the 3/2 directional control valve 6.2 switches later than the pilot valve 7 upon slowing of the drive motor 1 as a consequence of higher loading upon for example travel up an incline and switches earlier than the pilot valve 7, when the vehicle is driven from the propulsion wheels, for example upon travel down an incline. When the desired speed indicated by the gas pedal 8 and the actual speed of the drive motor are in agreement, both valves 6.2 and 7 switch simultaneously.

Figure 3:
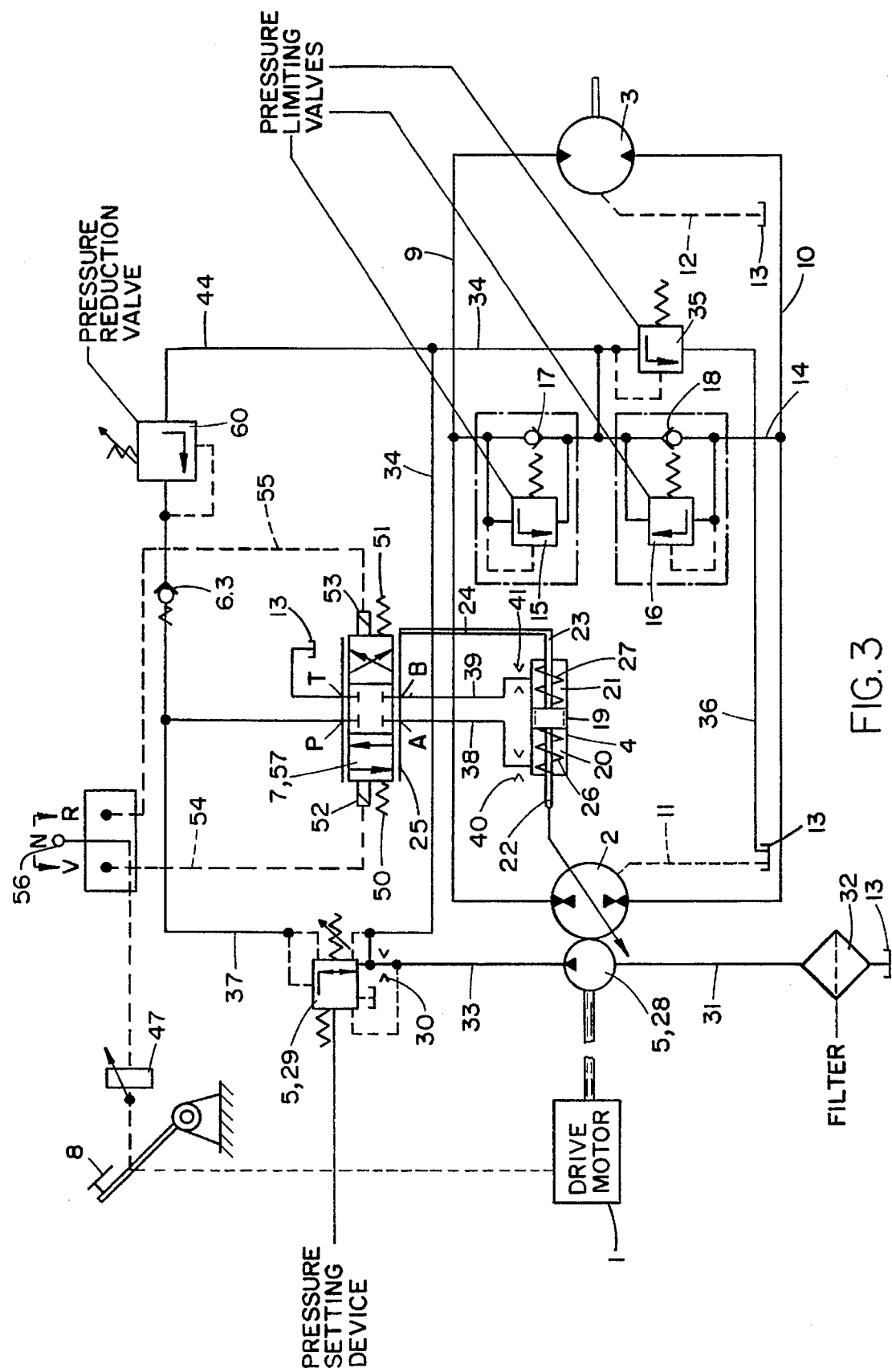

The hydraulic propulsion drive according to the third exemplary embodiment in accordance with FIG. 3 differs, with otherwise similar construction, from that of FIG. 2, in that the switching device is formed as a non-return valve 6.3 arranged in the pressure medium line 44, which non-return valve opens in the direction of the setting pressure line 37 extending through from the DA control valve 29 to the pilot valve 7. Upstream of the non-return valve 6.3 there is a pressure reduction valve 60 in the pressure medium line 44 which is adjustable for the purpose of generating differing output pressures. In the normal position, the non-return valve 6.3 is open so that it connects the pressure medium line 44 with the setting pressure line 37. In the switched or closed position the non-return valve 6.3 blocks the pressure medium line 44.

With this propulsion drive, the setting device 4 is acted upon by the speed-independent setting pressure in the pressure medium line 44 so long as this is greater than the speed-proportional setting pressure in the setting pressure line 37 and in this way holds the non-return valve 6.3 in its normal position. As soon as the speed-proportional setting pressure exceeds the speed-independent setting pressure, the non-return valve 6.3 closes whereby the action of the speed-independent setting pressure on the setting device is prevented and travel in the speed controlled range is possible. The switching point of the non-return valve 6.3 from the normal position into the switched position can be adjusted by setting the output pressure of the pressure reduction valve 60.

Instead of the above described mechanical follow-up there may, of course, be employed any other follow-up means, for example by means of springs or hydraulic pressure (follower pistons) or also an electrical follow-up system.

In place of the electrical control, also a hydraulic control or a mechanical actuation of the pilot valve 7 is conceivable.

Instead of or in addition of the hydraulic pump, the hydraulic motor may also be adjustable and equipped with a setting device, a pilot valve and a switching device.

What is claimed is:

1. A hydrostatic propulsion drive,
    having a drive motor of variable speed of rotation,
    having a hydrostatic transmission which includes at least two hydraulic machines arranged in a hydraulic circuit, of which one machine is in driving connection with the driving motor and the other machine is provided for propelling at least one vehicle wheel,
    having a setting device for adjusting the displacement volume of at least one of the hydraulic machines,
    having a device for generating a setting pressure proportional to the speed of the drive motor in a setting pressure line leading to the setting device,
    having a manually actuable pilot valve, arranged in the setting pressure line, which pilot valve is connected to the setting device via a follow-up device and, in dependence upon its respective through-flow position within a through-flow adjustment range with effective follow-up into the closed position, controls the volume of a pressure medium supplied to the setting device, and after switching over into a through-flow end position outside the range of effective follow-up acts upon the setting device with a setting pressure proportional to the speed,
    characterized in that,
    a pressure medium line for pressure medium to be supplied to the setting device when follow-up of the pilot valve is effective can be connected to the setting pressure line upstream of the pilot valve via a switching device with a pressure independent of the speed of the drive motor and
    in that the switching device has a normal position and a switched position and in the normal position connects the pressure medium line to the setting pressure line and blocks action of the speed-proportional setting pressure on the setting device, and in the switched position blocks the pressure medium line and acts upon the setting device with the speed-proportional setting pressure.

2. The hydrostatic drive according to claim 1, characterized in that,
    the switching device has a manual switching means which is manually switchable from the normal position into the switched position, and back.

3. The hydrostatic drive according to claim 1, characterized in that,
    the switching device has an automatic switching means which switches automatically from the normal position into the switched position, and back.

4. The hydrostatic drive according to claim 3, characterized in that, the automatic switching means switches automatically in dependence upon the speed of the drive motor.

5. The hydrostatic drive according to claim 1,
    characterized in that,
    the switching device and the pilot valve are switchable or switch approximately simultaneously from the normal position into the switched position, and back, or from the through-flow adjustment range with effective follow-up into the through-flow end position outside the range of effective follow-up, and back.

6. The hydrostatic drive according to claim 1,
    characterized in that,
    the switching point of the switching device is adjustable.

7. The hydrostatic drive according to claim 1,
    characterized in that,
    the switching device is a 3/2 directional control valve having a working connection (P) to a first section of the setting pressure line, the first section leading to the device for generating the speed-proportional setting pressure proportional, a working connection (A) to a second section of the setting pressure line leading further to the pilot valve, and a working connection (B) to the pressure medium line.

8. The hydrostatic drive according to claim 7, characterized in that, the 3/2 directional control valve is controllable by means of a control signal in the direction of the switched position.

9. The hydrostatic drive according to claim 8, characterized in that, the control signal for the 3/2 directional control valve is an electrical control signal.

10. The hydrostatic drive according to claim 8, characterized in that, the control signal for the 3/2 directional control valve is the speed-proportional setting pressure.

11. The hydrostatic drive according to claim 1, 3 or 4, characterized in that, the switching device is a non-return valve arranged in the pressure medium line, which non-return valve opens in the direction of the setting pressure line.

12. The hydrostatic drive according to claim 11, characterized in that, the highest value of the pressure, in the pressure medium line, independent of the speed of the drive motor is at least equal to the maximum value of the speed-proportional setting pressure.

13. The hydrostatic drive according to claim 12, characterized in that, a pressure reduction valve is arranged in the pressure medium line upstream of the non-return valve.

14. The hydrostatic drive according to claim 13, characterized in that, the pressure reduction valve is adjustable for the purpose of generating differing output pressures.

15. The hydrostatic drive according to claim 1, characterized in that, the device for generating the setting pressure proportional to the speed of the drive motor includes an auxiliary pump driven by the drive motor and a control valve connected to the auxiliary pump via a connection line, which control valve transforms the speed-proportional pressure medium flow generated by the auxiliary pump into a speed-proportional pressure which is available as setting pressure at the output of the control valve in the setting pressure line.

16. The hydrostatic drive according to claim 15, characterized in that, the pressure medium line is connected to the connection line leading from the auxiliary pump to the control valve.

17. The hydrostatic drive according to claim 1, characterized in that, the pilot valve is actuable by means of the gas pedal for controlling the speed of the drive motor.

* * * * *